United States Patent
> Diwinsky et al.

[15] 3,664,922
[45] May 23, 1972

[54] IN-SERVICE INSPECTION OF REACTOR VESSEL WELDS

[72] Inventors: Gordon A. Diwinsky, Windsor; Richard P. Kosky, East Granby, both of Conn.

[73] Assignee: Combustion Engineering, Inc., Windsor, Conn.

[22] Filed: Dec. 18, 1969

[21] Appl. No.: 886,231

[52] U.S. Cl. ..........................................176/19 R, 176/30
[51] Int. Cl. ..........................................................G21c 19/00
[58] Field of Search ........................................176/19, 19 I, 30

[56] References Cited

UNITED STATES PATENTS

| 3,173,844 | 3/1965 | Jones | 176/30 |
| 3,321,370 | 5/1967 | Oppenheimer | 176/30 X |
| 3,421,635 | 1/1969 | Bunger | 176/30 X |

*Primary Examiner*—Carl D. Quarforth
*Assistant Examiner*—Harvey E. Behrend
*Attorney*—Carlton F. Bryant, Eldon H. Luther, Robert L. Olson, John F. Carney, Richard H. Berneike, Edward L. Kochey, Jr. and Lawrence P. Kessler

[57] ABSTRACT

Method and apparatus for in-service inspection of nuclear reactor vessel welds. A support mechanism housing an inspection device is positioned within the reactor vessel after the internals thereof are removed. The hoist mechanism for the refueling device is then used to manipulate the inspection device from its support mechanism to the weld areas to be inspected. The inspection device includes means for remote visual and volumetric examination of the cladding and weld surfaces, respectively, as well as a displacement indicating means for determining the position of the inspection device with respect to the weld being inspected.

8 Claims, 7 Drawing Figures

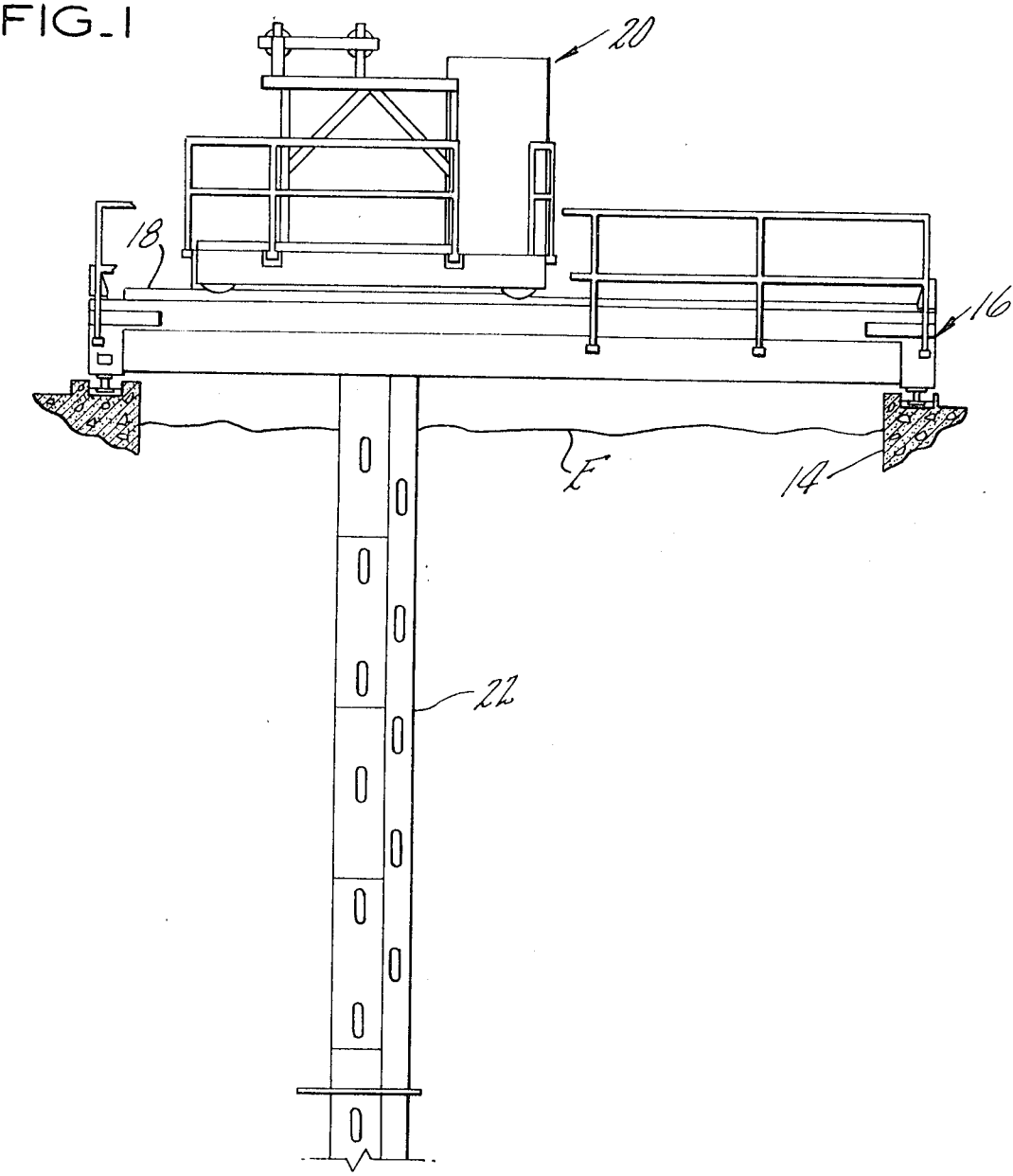

INVENTORS
RICHARD P. KOSKY
GORDON A. DIWINSKY
BY Lawrence P. Kessler
ATTORNEY

Patented May 23, 1972 3,664,922

INVENTORS
RICHARD P. KOSKY
GORDON A. DIWINSKY

BY Lawrence P. Kessler
ATTORNEY

3,664,922

IN-SERVICE INSPECTION OF REACTOR VESSEL WELDS

BACKGROUND OF THE INVENTION

High safety standard are necessarily required in nuclear reactor facilities in order to guard against release of dangerous fission products in the event of a reactor malfunction. These safety standards extend to periodic in-service inspection of physical components of the reactor facility to ensure the structural integrity thereof. The inspecting procedure includes a detailed investigation of the welds and surrounding weld areas, both longitudinal and horizontal, of the reactor pressure vessel as well as the internal cladding thereof. This inspection is, of course, necessary to ensure structural soundness in the pressure vessel which is a fundamental component of the reactor facility and is subjected to environmental conditions approximating 2,500 psi and 650° F.

SUMMARY OF THE INVENTION

There is herein provided a method and apparatus for inservice inspection of reactor welds. A support mechanism housing an inspection device is positioned within the reactor vessel after the internals thereof are removed. The hoist mechanism for the refueling device is then used to manipulate the inspection device from its support mechanism to the weld areas to be inspected. The inspection device includes means for remote visual and volumetric examination of the cladding and weld surfaces, respectively, as well as a displacement indicating means for determining the position of the inspection device with respect to the weld being inspected.

BRIEF DESCRIPTION OF THE DRAWINGS

FIGS. 1 and 1a are an elevational view of the inservice weld inspection device being positioned by the refueling apparatus within a typical nuclear reactor vessel, the inspection device being in its inspection position.

FIG. 3 is a sectional plan view along lines 3—3 of FIG. 1a.

DESCRIPTION OF THE PREFERRED EMBODIMENT

Figure 1A:
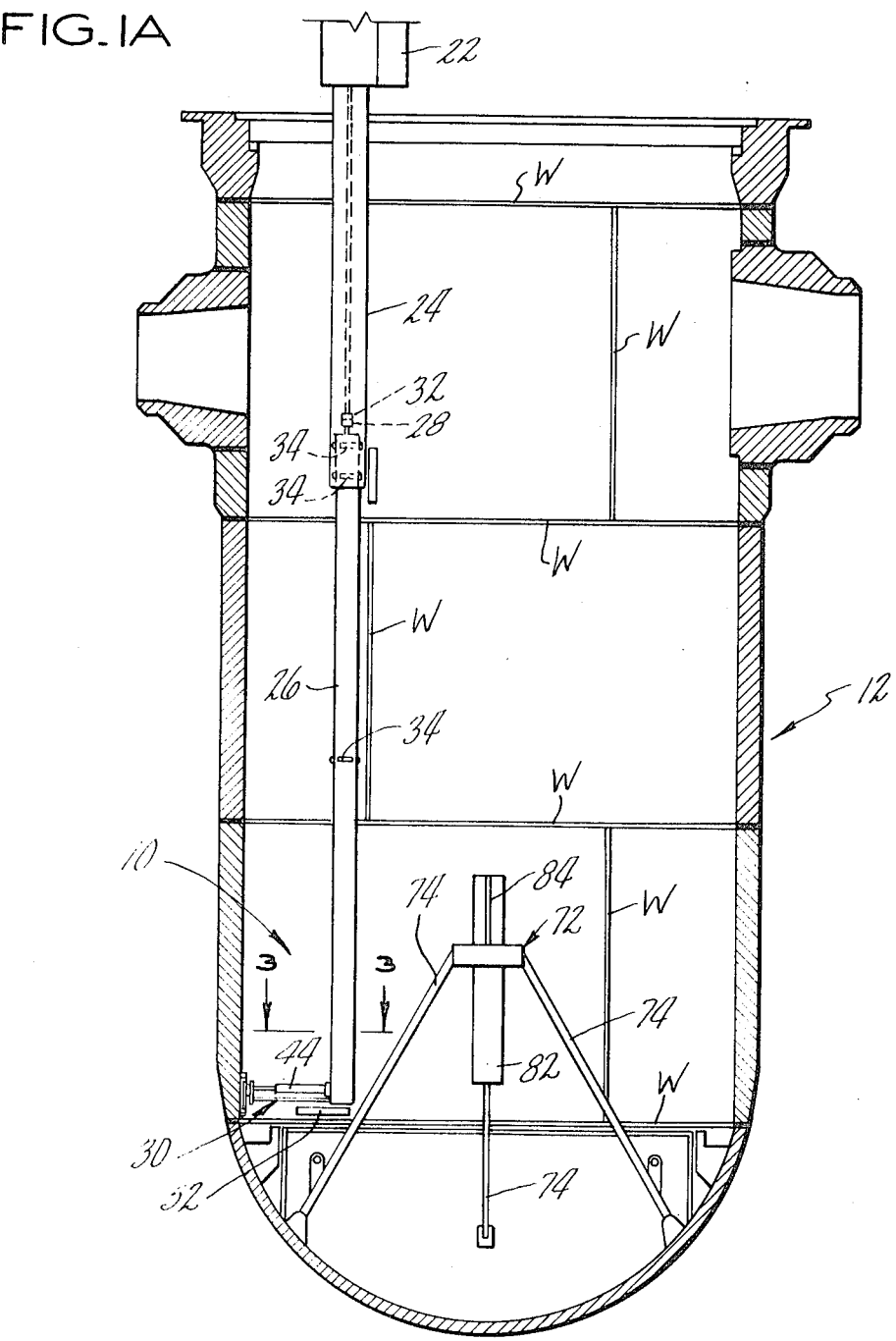
Figure 2:
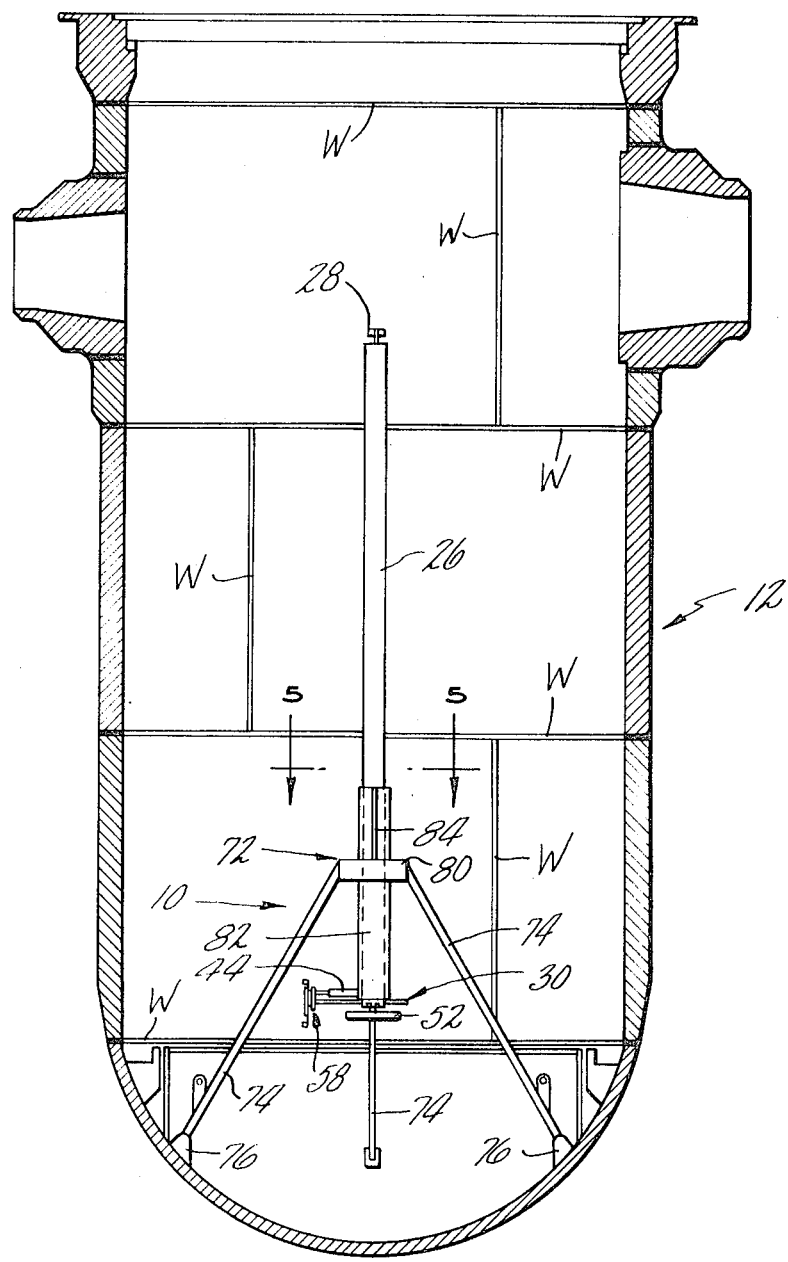
FIG. 2 is an elevational view of the inspection device as supported within its support mechanism in the reactor vessel.

Referring now to the drawings, FIGS. 1 and 1a show an inservice inspection device 10 for inspecting welds W within a nuclear reactor pressure vessel 12. In a typical nuclear steam supply reactor, the pressure vessel 12 is set within a concrete vault 14 and has overlying the vessel 12 a bridge 16. Bridge 16 is equipped with ways 18 for a movable refueling machine 20, such as fully described in U. S. Pat. No. 3,421,635 to R. C. Bunger, for accurate positioning over the pressure vessel 12. The refueling machine 20 has a mast 22 extending downwardly into the vault 14 to a point just above the vessel 12 and additional provisions (not shown) for general hoisting and remote control work within the reactor vault 14. Within the mast is a hoist box 24 used primarily for transferring fuel elements as described in the above-noted patent and herein additionally utilized in a manner to be described below.

The in-service inspection device 10 is comprised of a hoist box extension 26 having a lifting handle 28 for releasable coupling with a standard connection to the hoist box 24 at one end and a weld examination mechanism 30 at the other. The lifting handle 28 releasably nests within a recess 32 in the hoist box 24 so as to be raised and lowered therewith. At points along its length, extension 26 has guide rollers 34 to guide its movement within the hoist box 24.

Figure 3:
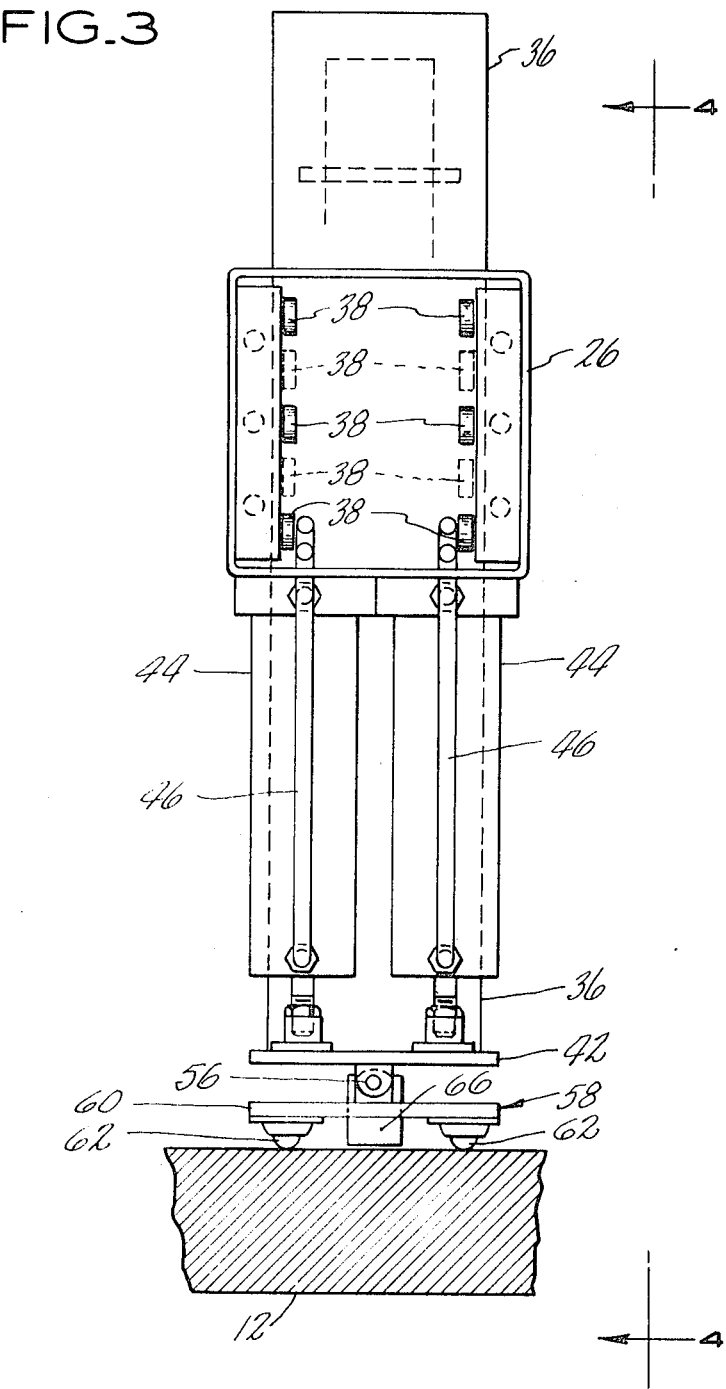
Figure 4:
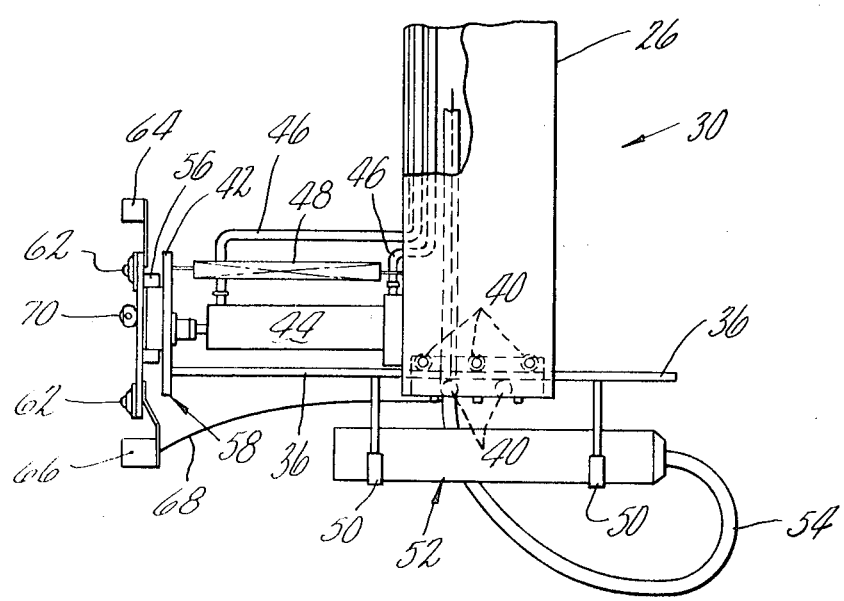
FIG. 4 is a side elevational view of the lower portion of the inspection device taken on line 4—4 of FIG. 3.

The weld examination mechanism 30, as best seen in FIGS. 3 and 4, contains means for remote visual and volumetric inspection of the overlying cladding and welds W, respectively, of the nuclear reactor pressure vessel 12. A slide assembly 36 is reciprocably positioned on rollers 38 which are in turn mounted on pins 40 in the lower end of hoist box extension 26. Fixed to the end of the slide assembly 36 is a mounting plate 42. Between the mounting plate 42 and the hoist box extension 26 are fixed positive pressure drive units 44 supplied with pressure through lines 46 and a positive safety return spring 48. Brackets 50 fixed to the slide assembly 36 at its underside support visual inspection mechanism such as a TV camera 52 having a power lead 54 which extends to a remote monitor through the hoist box extension 26.

Pivoted to the mounting plate 42 by means of pivot pin 56 on the opposite side of the plate from the positive pressure drive units 44 is a volumetric inspection mechanism 58. The volumetric inspection mechanism 58 includes a carriage assembly 60 having multidirectional wheels 62 for engaging the reactor vessel wall 12 and a proximity indicator 64 for giving a remote indication of when the mechanism 58 is to contact vessel wall 12. Fixed to the carriage assembly 60 of the volumetric inspection mechanism 58 is an ultrasonic transducer crystal 66 having a readout cable 68, which extends to a remote monitor through the hoist box extension 26, and a digital displacement indicator 70. The remote monitors for the TV camera 52, the ultrasonic transducer crystal 66, and the readout from the digital displacement indicator 70, while not shown, may be conveniently located on the refueling machine 20 in any well-known manner.

Figure 5:
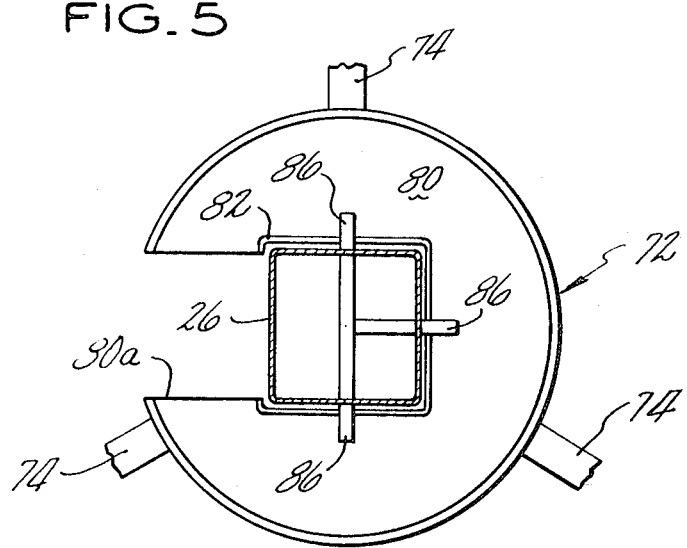
FIG. 5 is a sectional plan view along the lines 5—5 of FIG. 2.
Figure 6:
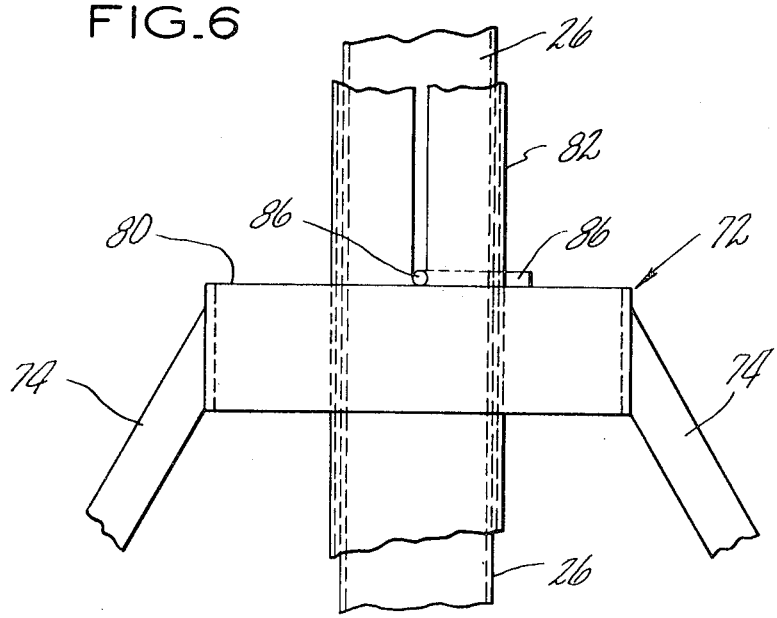
FIG. 6 is an elevational view of the support mechanism for the inspection device of FIGS. 1 and 2.

In order to initially position and support the in-service inspection device 10 within the reactor vessel 12, a support mechanism 72 is provided. The support mechanism 72 is a tripod fixture having three legs 74 with appropriately shaped feet 76 engaging the bottom of the reactor vessel 12. The legs 74 have grapple eyes 78 just above the feet 76 and are interconnected at the ends opposite the feet by collar 80. The collar 80 has an opening 80a to permit passage of the weld examination mechanism 30 through the collar and additionally supports housing 82 having longitudinal guide slots for accepting and supporting locating pins 86 fixed to the hoist box extension 26 (see FIGS. 5 and 6).

With the apparatus thus described, the method of in-service reactor weld inspection ideally incorporating the above device will now be detailed. It is noted that, since the reactor vessel is radioactively contaminated after the period of use at which time in-service inspection of the welds is required, the inspection must be accomplished remotely. Ideally, the inspection technique is carried out during the down time occasioned by refueling of the reactor core so that the reactor internals can be removed from the vessel.

During refueling the reactor vault must be flooded to a level F to prevent escape of radioactivity which will endanger personnel working on the refueling process from the refueling machine 20 on the bridge 16. The reactor vessel internals (spent core bundle, core basket, thermal shield, etc.) are removed from the reactor vessel 12 but maintained within the refueling chamber (upper portion) of the vault 14. With the internals thus removed, the inspection device 10 as supported in the support mechanism 72 is lowered into the vessel by means of a hoist (not shown) within the facility connected by cables to the grapple eyes 78 on the legs 76 of the support mechanism 72 until the feet 76 seat on the bottom of the vessel 12. The refueling machine 20 and the associated mast 22 are then positioned over the inspection device 10 and the hoist box 24 is lowered to permit the lifting handle 28 of the hoist box extension 26 to be engaged by the recess 32 to permit the inspection device to be lifted from the housing 82 of the support mechanism 72.

The refueling machine 20 will then manipulate the inspection device 10 to a position adjacent the reactor vessel wall 12 at the level at which weld inspection is desired. Positive drive units 44 are activated to move the weld examination mechanism 30 to the weld W to be inspected. The proximity indicator 64 warns that the multidirectional wheels 62 are about to engage the vessel wall 12 so that positive power units 44 can be regulated to hold the mechanism 30 against the wall. The TV camera 52 and the ultrasonic transducer crystal 66 are then activated and inspection is begun.

When is is desired to inspect a longitudinal weld, hoist box 24 is activated to raise and lower inspection device 10 and its associated weld examination mechanism 30. For inspection of horizontal welds, the hoist box 24 may be rotated about its longitudinal axis so that weld examination mechanism 30 can transverse the desired weld area to be inspected. When the inspection device 10 is rotated for inspection purposes, pressure in the positive drive units 44 assures that the volumetric inspection mechanism 58 remains seated against the weld to be inspected for accurate volumetric inspection.

As the inspection device 10 transverses the weld area to be inspected, the TV camera 52 provides a remote visual view of the cladding over the particular weld being inspected while the ultrasonic transducer crystal 66 provides a volumetric analysis of the weld pointing out any voids, occlusions or faults which may have developed in service. The location relative to the weld W is noted by the digital displacement indicator 70 so that several passes over the weld area may be accurately made without duplicated effort. This is necessary since the ultrasonic transducer crystal 66 of the volumetric inspection mechanism 58 is only about 2 inches wide and the area necessary to be inspected is several times that width.

When the desired inspection procedure is completed, the inspection device 10 is returned to its resting position within the housing 82 of the support mechanism 72 by the hoist box 24 of the refueling machine 20. The support mechanism 72 may then be removed from the reactor vessel 12 by means of the hoist (not shown) from the reactor facility.

From the foregoing it is apparent that there is herein provided a unique in-service inspection device for remotely inspecting, both visual and volumetric, nuclear reactor pressure vessel walls. A support mechanism housing the inspection device is positioned within the pressure vessel. The inspection device includes a TV camera for remote visual clad inspection, an ultrasonic transducer crystal for remote volumetric weld inspection and a digital displacement indicator for indicating position of the inspection device relative to a particular weld area being inspected. The inspection device has an extension adapted to be engaged by the refueling machine lifting mechanism so that manipulation of the inspection device can be accomplished by said refueling machine.

While this preferred embodiment of the invention has been shown and described, it will be understood that it is merely illustrative and that changes may be made without departing from the scope of the invention as claimed.

We claim:

1. In a nuclear reactor facility having a reactor vault, a pressure vessel having clad welded walls within said vault, a bridge overlying said pressure vessel, and a refueling machine mounted on said bridge for movement thereon, the improvement comprising:
an in-service inspection apparatus for remotely inspecting said pressure vessel welds, the inspection apparatus including a support mechanism removable positionable within said reactor pressure vessel, and an inspection means for remote visual and volumetric cladding and weld inspection, respectively, removably housed within said support mechanism, said inspection means having an extension therefrom selectively engagable by said refueling machine for moving said inspection means from said support mechanism to an inspection position.

2. The apparatus of claim 1 wherein said inspection means includes a remote visual inspection means, a remote volumetric inspection means, a proximity indicator for determining approach to said vessel wall in which is located the weld to be inspected, a digital displacement indicator for determining position relative to said weld being inspected, and means for maintaining said inspection means against said vessel wall during weld inspection.

3. The apparatus of claim 2 wherein said remote visual inspection means includes a TV camera means for sending a signal indicative of a visual representation of said cladding overlying said weld area being inspected to a remote monitor.

4. The apparatus of claim 2 wherein said remote volumetric inspection means includes an ultrasonic transducer crystal means for sending a signal indicative of the volumetric condition of said weld being inspected to a remote monitor.

5. The apparatus of claim 2 wherein said means for maintaining said inspection means against said vessel wall includes a slidable carriage assembly supporting said volumetric inspection means, said proximity indicator, and said digital displacement indicator, and controllable positive pressure drive units selectively biasing said carriage assembly against said pressure vessel wall during weld inspection.

6. The apparatus of claim 1 wherein said support mechanism includes a tripod fixture having three legs and appropriately shaped feet for engaging the bottom of said pressure vessel, housing means interconnecting said legs and providing a support for said inspection means, and means on said support mechanism for permitting said mechanism to be lowered and raised into and out of said pressure vessel.

7. In a nuclear reactor facility having a reactor vault, a pressure vessel having clad welded walls within said vault, a bridge overlying said pressure vessel, a refueling machine mounted on said bridge for movement thereon, and a hoist mechanism, a method for in-service inspection of the cladding and welds of said pressure vessel comprising the steps: flooding the reactor vault to prevent the escape of radioactivity, removing the internals from said pressure vessel, positioning a remote visual and volumetric inspection means within said pressure vessel in a support means, and manipulating said remote visual and volumetric inspection means by said refueling machine to accomplish said cladding and weld examination.

8. The method of claim 7 wherein the step of manipulating said remote visual and volumetric inspection means includes the steps of interconnecting said refueling machine and said inspection means, removing said inspection means from its support means by said refueling machine, moving said refueling machine to move said inspection means to the weld areas to be inspected, visually and volumetrically inspecting said cladding and said welds, respectively, and returning said inspection means to its support means by said refueling machine.

* * * * *